3,522,230
PROCESS FOR SEPARATING LIGNIN FROM VEGETABLE MATERIAL USING A MIXTURE OF TRIETHYLENEGLYCOL AND ARYLSULFONIC ACIDS
Leonard F. Burkart, Nacogdoches, Tex., assignor, by mesne assignments, to Norman Quigley, Stateline, Nev.
No Drawing. Continuation-in-part of application Ser. No. 499,001, Oct. 20, 1965. This application Jan. 23, 1969, Ser. No. 793,609
Int. Cl. C07g 1/00; D21c 3/20
U.S. Cl. 260—124                                    6 Claims

ABSTRACT OF THE DISCLOSURE

A method for treating lignocellulosic materials for removal of lignin and other non-carbohydrates as well as non-cellulosic carbohydrates from cellulosic matter. The removal is effected by means of a triethyleneglycol liquor containing phenolsulfonic or paratoluenesulfonic acids. The rich liquor is then mixed with an organic solvent under basic pH conditions so as to precipitate the non-carbohydrates and non-cellulosic carbohydrates for further separation.

CROSS-REFERENCES TO RELATED APPLICATIONS

This application is a continuation-in-part of a copending application Ser. No. 499,001, filed Oct. 20, 1965 and having issued on May 6, 1969 as U.S. Letters Patent No. 3,442,753.

SUMMARY OF THE INVENTION

The present invention relates to treatment of ligneous vegetable matter and more particularly to a method of and a liquor for removing non-cellulosic carbohydrate and non-carbohydrate materials from lignified plant matter and converting residual carbohydrate fractions into commercially useful products.

It would be highly advantageous to derive useful products such as furfural compounds from ligneous carbohydrate materials occurring naturally in abundance. It would also be highly advantageous to derive lignin from the same material both economically and expediently as well as converting cellulosic materials of such matter when desired into pulp useful in the paper-making industry. The present invention is specifically directed to accomplishing such results by the provision of a liquor which solubilizers and extractively delignifies ligneous vegetable matter.

It is therefore an object of the present invention to provide a liquor or solvent attaining the foregoing advantages with surprising decrease of treatment time for pulping and delignifying plant materials as well as effectively converting carbohydrate fractions of such material into furfural compounds or other organic compounds of possible economic use.

A further object of the present invention is to provide an improved process for the removal of lignin and non-cellulosic carbohydrates from lignocellulosic materials at relatively low temperatures and atmospheric pressure, the lignin so removed being readily recoverable in a form with desirable properties for the manufacture of adhesives, binders, plastics, and extenders for such and similar materials, the non-cellulosic carbohydrates also being readily recoverable in a form with desirable properties for manufacture into furfural and for other industrial chemical uses.

Another object of the invention is to provide a process whereby residual carbohydrate fractions of ligneous vegetable matter can be converted into furfural compounds and other organic materials of value.

A still further object of the present invention is to provide a process whereby cellulosic materials of ligneous vegetable matter can be reduced to pulp and recovered for further use.

Still another object of the present invention is the provision of a unique liquor or solvent system which serves to accomplish the foregoing objectives by chemical reaction and combination with ligneous vegetable matter.

Other and further objects, features and advantages will be apparent from the following description of the invention given for the purpose of disclosure.

DESCRIPTION OF THE PREFERRED EMBODIMENTS

The present invention generally provides a liquor or solvent for and a method of removing non-carbohydrate materials commonly known as lignin from comminuted wood, wood residues, and other lignified plant materials and converting residual non-cellulosic carbohydrate fractions known as hemi-celluloses into furfural compounds and other organic materials. In addition, the present invention provides a unique method for recovering lignin as well as cellulosic materials.

A highly desirable liquor for treating ligneous vegetable matter may be obtained by reacting triethyleneglycol with a small amount of organic acid such as phenolsulfonic acid or paratoluenesulfonic acid. The resulting reaction mixture, which contains both aliphatic and aromatic compounds such as aldehydes, ketones, alcohols, acids, esters, saturated and unsaturated hydrocarbons in varying amounts possesses unique solvent properties for the non-cellulosic carbohydrate and non-carbohydrate fraction of lignocellulosic materials. Under different conditions of temperature, such reaction mixture or liquor possesses the ability to dissolve the carbohydrate fractions by progressive degradation of the cellulose and remaining hemi-cellulose constituents.

When ligneous vegetable matter is heated initially with the liquor, non-carbohydrate material is dissolved and may be removed by draining or centrifugation. The non-carbohydrate fraction is precipitated from the rich liquor by addition of water. The resulting precipitate is lignin material which may be recovered by filtration, washed with fresh water and dried at temperatures below 100° C. to prevent self-polymerization.

At this point, the residual carbohydrate material from which the lignin-rich liquor was separated may be washed for example with warm water and dried by suitable methods to provide a high quality wood pulp.

In the alternative, the residual carbohydrate material may be further processed by dissolving in fresh liquor at elevated temperatures until substantially all of it goes into solution. Furfural, 5-hydroxymethylfurfural and other organic materials may be separated from each solution by steam distillation or other suitable means known in the art.

It will be recognized that spent liquor from any of the above steps may be reconcentrated by evaporation of water at reduced pressure and reused in the process with freshly prepared liquor.

EXAMPLE I

Triethyleneglycol was mixed and reacted with approximately 0.5 percent by total weight of solution of phenolsulfonic acid by heating the mixture to a temperature of about 125° C. to about 135° C. and maintaining the mixture at said temperature for about one hour. The resultant reaction mixture was then used as a liquor as will be described. Essentially dry wood sawdust was placed in a closed reaction vessel and covered with the liquor. Temperature of the liquor-sawdust mixture was raised to about 125° C. to about 135° C. and maintained at this temperature for 30 to 60 minutes under mild agitation. The reaction vessel was equipped with a condenser to condense volatile materials driven off as digestion proceeded. Then the liquor was filtered from the disintegrated wood fibers and was diluted with two to two and one-half volumes of clean water to precipitate out substantially all of the dissolved non-carbohydrate or lignin material therein. Such lignin material was then filtered and washed with fresh water and dried at temperatures below 100° C. At this point, the residual wood fraction was suitable for further use as a wood pulp. However, fresh liquor was added to the residual wood or carbohydrate fraction and the temperature was raised to the range of about 160° C. to about 180° C. and maintained at that level for 1.5 to 2 hours to dissolve substantially all of such material except for humic residue. The resulting furfurals and other organic compounds in the glycol liquor were then recovered.

EXAMPLE II

Triethyleneglycol was reacted with approximately 0.5 percent by total weight of solution of paratoluenesulfonic acid for one hour by heating to about 125° C. to about 135° C. Esssentially dry wood sawdust was placed in a closed reaction vessel as above and covered with the liquor solution and maintained for 30 to 60 minutes at a temperature of about 125° C. to about 135° C. under mild agitation. Then the liquor containing extracted lignin was drained and separated from the residue of soft disintegrated wood fibers. The wood fiber residue was suitable for use as a high quality pulp for use in paper products. However, fresh liquor was added to such wood residue to cover it and the temperature was raised to about 160° to about 180° C. and maintained at that level for 1.5 to 2 hours to dissolve substantially all of the wood material except for a humic residue. The resulting furfurals and other organic compounds in the glycol liquor were then recovered. The lignin-rich liquor first separated from the wood residue was diluted with two to two and one-half volumes of clean water whereupon the dissolved lignin precipitated and was recovered by filtration, washed with fresh water and dried at temperatures below 100° C.

EXAMPLE III

A triethylene glycol liquor was prepared as in Example II and added to essentially dry wood sawdust so as to cover the wood in a closed reaction vessel. To obviate a "double cook" as in Examples I and II, the wood-liquor mixture was maintained for one to three hours at a temperature of about 125° C. to about 135° C. under mild agitation. Then the wood residue or disintegrated fibers was separated from the liquor by filtration and the liquor was diluted with two to three volumes of acetone. The liquor-acetone solution was made slightly basic by addition of enough dilute sodium hydroxide so as to produce a brown precipitate. Such precipitate was removed by filtration and was dissolved (readily) in water. The pH of the water solution was made acidic by addition of a small amount of, for example, sulfuric acid to precipitate a lignin or non-carbohydrate fraction which was separated by filtration. The supernatant water solution was concentrated as by steam distillation to recover the carbohydrate fraction.

The triethyleneglycol and acetone separated from the brown precipitate were recovered by evaporating off the acetone under reduced pressure. The glycol was neutralized and, upon addition of fresh paratoluenesulfonic acid, was suitable for reuse.

As indicated by Example III, the use of acetone rather than water for precipitating dissolved material from the rich liquor results in removal of both carbohydrate and non-carbohydrate fractions from the liquor (after contact with the wood) whereas water effects removal of non-carbohydrates only. In addition, the glycol is recovered by mere evaporation of the acetone whereas heat is required to boil off water from the glycol in recovering the glycol for reuse. While acetone is preferred, other miscible organic solvents may be used such as methyl-ethyl ketone, or methyl or ethyl alcohols.

With further reference to Example III, the length of time of the "cook" will determine quantitatively how much of the carbohydrate and non-carbohydrate materials are removed in the "cooking" process. Thus the length of time may be varied although one to three hours will provide an optimum yield.

In further practices of the present invention, it was determined that the liquors of Examples I and II provided comparable results by initially reacting the triethyleneglycol and about .5 percent by total weight of solution of phenolsulfonic or paratoluenesulfonic acids at ambient temperature for about 24 to 48 hours rather than by heating to about 125° C. to 135° C. for one hour. Also, it was found that the 0.5 percent concentration of acid in the liquor is not critical although concentration has a direct relation to effectiveness of delignification of the cellulosic material. Slightly smaller or larger amounts of acid may be advantageously used.

Thus provided by the present invention is a liquor for and a method of delignifying wood or other ligneous vegetable matter as well as effectively pulping or digesting such matter and deriving valuable organic compounds therefrom.

The present invention, therefore, is well adapted to carry out the objects and attain the ends and advantages mentioned as well as others inherent therein. The composition and process may be resorted to without departing from the spirit and scope of the invention as hereinafter claimed.

What is claimed is:
1. The method of treating ligneous vegetable matter to effect removal of non-cellulosic material therefrom which comprises,
  (a) subjecting said matter to the digesting and extracting action of a liquor for about one to about three hours at about 125° C. to about 135° C.,
  (b) said liquor being a reaction product obtained by mixing triethylene glycol with at least about 0.5 percent by total weight of organic acid selected from the group consisting of phenolsulfonic acid and paratoluenesulfonic acid, and maintaining the mixture at ambient temperature for about 24 hours,
  (c) separating the extraction liquor from said matter to provide a liquor rich in non-cellulosic material, and
  (d) mixing said rich liquor with an organic solvent under basic pH conditions so as to precipitate the non-cellulosic material, said organic solvent being selected from the group consisting of acetone, methyl-ethyl ketone, methyl alcohol and ethyl alcohol.

2. The method of claim 1 including, additionally, separating the precipitated non-cellulosic material from the solvent and liquor,
mixing the non-cellulosic material with water under acidic pH conditions so as to precipitate lignin.

3. The method of claim 1 wherein in step (d) the basic pH is obtained by addition of sodium hydroxide to the liquor and organic solvent.

4. The method of treating ligneous vegetable matter to effect removal of non-cellulosic material therefrom which comprises,
  (a) subjecting said matter to the digesting and extracting action of a liquor for about one to about three hours at about 125° C. to about 135° C.,
  (b) said liquor being a reaction product obtained by mixing triethylene glycol with at least about 0.5 percent by total weight of organic acid selected from the group consisting of phenolsulfonic acid and paratoluenesulfonic acid, heating said mixture to a temperature of about 125° C. to 135° C., and maintaining the mixture at said temperature for about one hour, (c) separating the extraction liquor from said matter to provide a liquor rich in non-cellulosic material, and (d) mixing said rich liquor with an organic solvent under basic pH conditions so as to precipitate the non-cellulosic material, said organic solvent being selected from the group consisting of acetone, methyl-ethyl ketone, methyl alcohol and ethyl alcohol.

5. The method of claim 4 including, additionally,
separating the precipitated non-cellulosic material from the solvent and liquor,
mixing the non-cellulosic material with water under acidic pH conditions so as to precipitate lignin.

6. The method of claim 4 wherein in step (d) the basic pH is obtained by addition of sodium hydroxide to the liquor and organic solvent.

References Cited

UNITED STATES PATENTS 2,772,968   12/1956   Grondal et al. ___ 260—124 XR

CHARLES B. PARKER, Primary Examiner

D. R. PHILLIPS, Assistant Examiner

U.S. Cl. X.R.

162—76, 77; 260—124, 209, 342.9, 456